(12) United States Patent
Marupaduga et al.

(10) Patent No.: US 11,166,199 B1
(45) Date of Patent: Nov. 2, 2021

(54) DYNAMIC FREQUENCY ALLOCATION

(71) Applicant: T-Mobile Innovations LLC, Overland Park, KS (US)

(72) Inventors: Sreekar Marupaduga, Overland Park, KS (US); Rajveen Narendran, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 16/242,429

(22) Filed: Jan. 8, 2019

(51) Int. Cl.
*H04W 28/22* (2009.01)
*H04W 72/04* (2009.01)
*H04W 24/08* (2009.01)

(52) U.S. Cl.
CPC .......... *H04W 28/22* (2013.01); *H04W 24/08* (2013.01); *H04W 72/048* (2013.01); *H04W 72/0453* (2013.01); *H04W 72/0486* (2013.01)

(58) Field of Classification Search
None
See application file for complete search history.

(56) References Cited

U.S. PATENT DOCUMENTS

| | | | |
|---|---|---|---|
| 9,402,217 B1* | 7/2016 | Khan | H04W 36/22 |
| 2014/0256343 A1* | 9/2014 | Shaikh | H04W 28/22 455/452.2 |
| 2015/0063311 A1* | 3/2015 | Chindapol | H04W 36/0005 370/332 |
| 2019/0037560 A1* | 1/2019 | Huang | H04W 52/325 |

* cited by examiner

*Primary Examiner* — Huy D Vu
*Assistant Examiner* — Hong Shao (57) ABSTRACT

Methods and systems are provided for dynamically modifying bandwidth allocation corresponding to a first radio access technology and a second radio access technology. A current allocation of channel bandwidth corresponding to the first radio access technology and the second radio access technology is determined. One or more radio frequency conditions associated with a base station may be monitored, which could include loading at a particular cell site or sector and/or user devices that have a guaranteed bit rate. Based on monitoring of the radio frequency conditions, the current allocation of the channel bandwidth corresponding to the first radio access technology and the second radio access technology is dynamically modified to a different allocation of channel bandwidth corresponding to the first radio access technology and the second radio access technology.

15 Claims, 5 Drawing Sheets

DYNAMIC FREQUENCY ALLOCATION

SUMMARY

The present disclosure is directed, in part, to dynamically modifying channel bandwidth allocation between two or more radio access technologies at a cell site that implements a split mode antenna array. While typically channel bandwidth allocation is static and isn't able to be adjusted, embodiments described herein allow for the channel bandwidth to dynamically be reallocated amongst the radio access technologies at that particular cell site. In one aspect, the reallocation of channel bandwidth may be due to one or more radio frequency conditions, such as a quantity of user devices using a first radio access technology that exceeds a threshold, and/or that a quantity of those user devices have a guaranteed bit rate. For example, using 4G and 5G as examples of radio access technologies, if the quantity of 4G devices exceeds a threshold, which could be predetermined or determined in real-time, or if the quantity of 4G devices greatly exceeds the quantity of 4G/5G devices, the network may determine to reallocate channel bandwidth by increasing channel bandwidth for 4G and decreasing channel bandwidth for 5G. This allows for a better user experience, as users having 4G devices will experience a higher throughput (e.g., faster data transfer), etc.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As new radio access technologies are being deployed, legacy radio access technologies are still being used by many user devices, and as such, there needs to be a way for multiple radio access technologies to be used at the same cell site for different user devices. For instance, as 5G technology is beginning to be deployed, 4G, 3G, and other radio access technologies are still used by many carriers. Additionally, some user devices may not have the capability for 5G, and as such, these legacy user devices need to use 4G, 3G, and other legacy radio access technologies. Allocating channel bandwidth at the cell site, sector, or antenna level becomes an important issue, as in the beginning, most user devices may utilize the legacy radio access technologies, whereas very few user devices may utilize the new radio access technology currently being deployed. However, down the road, the opposite may be true.

In certain aspects, methods are provided for dynamically modifying channel bandwidth allocation between two or more radio access technologies based on radio frequency conditions. The radio frequency conditions, in one aspect, are monitored at a particular cell site (or a cluster of cell sites), or could be monitored for a particular sector of a cell site. Even more, the radio frequency conditions could be monitored for a particular antenna. While a static channel bandwidth allocation between two or more radio access technologies is typically used at a cell site, aspects described herein provide for a dynamic allocation of channel bandwidth.

In some aspects, radio frequency conditions are monitored and analyzed on a periodic basis, which could be at regular intervals or when there is a concern with the conditions. These radio frequency conditions could include, for example, loading for each of the available radio access technologies at the particular cell site in relation to the user devices attached to that cell site. So, if the quantity of 4G devices exceeds a threshold in relation to the quantity of 5G devices at that particular time, the system may determine that more channel bandwidth should be allocated to 4G than to 5G. While we discuss 5G devices, referring to user devices that are capable of using 5G technology, many of these 5G devices will be capable of not only 5G, but also 4G, 3G, etc., such that these devices can switch from 5G to 4G and to other radio access technologies as well.

In other aspects, radio frequency conditions could refer to not only a quantity of 4G devices attached to the cell site at a particular time, but also a quantity of those 4G devices that are GBR users, meaning they have a guaranteed bit rate (GBR). A GBR parameter is used to indicate the bandwidth (bit rate) to be guaranteed by the network for a particular user. Some devices have GBRs, and some do not. As such, if the quantity of 4G devices exceeds a threshold, and if a quantity of those devices that have GBRs exceeds a threshold, the system may take action to dynamically modify the channel bandwidth between the radio access technologies at that cell site.

In yet another aspect, there may be a situation when the quantity of 5G devices outnumbers the quantity of 4G devices. If the quantity of 5G devices exceeds a threshold in relation to the quantity of 4G devices, the system may adjust the channel bandwidth between the radio access technologies at that cell site.

There are several advantages to dynamically modifying channel bandwidth allocation between two or more radio access technologies at a cell site. For instance, it allows better throughput and coverage to those user devices that utilize the radio access technology having a higher channel bandwidth allocation. It allows not only for a better user experience, but allow for a higher network efficiency, as the network resources can be better allocated where needed.

In a first aspect, one or more computer-readable media is provided having computer-executable instructions embodied thereon that, when executed, perform a method for dynamically modifying bandwidth allocation corresponding to a first radio access technology and a second radio access technology. The method includes determining a current allocation of channel bandwidth corresponding to the first radio access technology and the second radio access technology, and monitoring one or more radio frequency conditions associated with a base station. Also, the method includes based on the monitoring, dynamically modifying the current allocation of the channel bandwidth corresponding to the first radio access technology and the second radio access technology to a different allocation of the channel bandwidth corresponding to the first radio access technology and the second radio access technology.

In another aspect, a method is provided for dynamically modifying bandwidth allocation corresponding to a first radio access technology and a second radio access technology. The method includes determining a first allocation of channel bandwidth corresponding to the first radio access technology and the second radio access technology, and determining that a quantity of user devices utilizing the first radio access technology is above a threshold. Further, the method includes reallocating the channel bandwidth corresponding to the first radio access technology and the second radio access technology based on the quantity of user devices utilizing the first radio access technology being above the threshold.

In yet another aspect, a system for dynamically modifying bandwidth allocation corresponding to a first radio access technology and a second radio access technology. The system comprises a processor and one or more computer storage hardware devices storing computer-usable instructions that, when used by the processor, cause the processor to perform operations. These operations include to determine a current allocation of channel bandwidth corresponding to 4G technology and 5G technology employed at a base station, and to determine that a quantity of user devices utilizing the 4G technology is above a threshold, and that a quantity of the user devices utilizing the 4G technology that also have guaranteed bit rates is above a threshold. Further, the operations include, based on the determining, to reallocate the channel bandwidth corresponding to 4G technology and 5G technology employed at a base station. The reallocating increases the channel bandwidth corresponding to the 4G technology.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention.

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
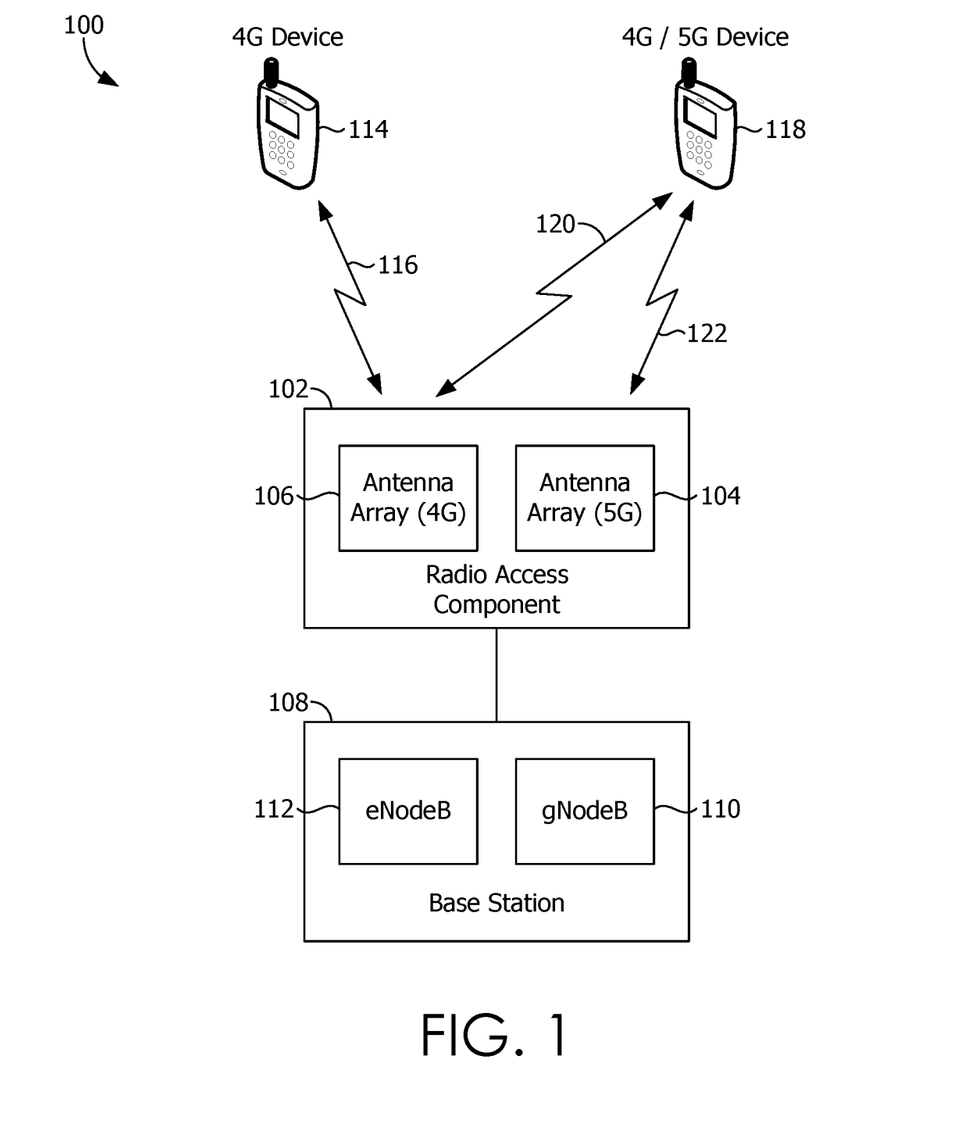
FIG. 1 depicts a diagram of an exemplary network environment suitable for use in implementations of the present disclosure.

Referring to FIG. 1, an exemplary network environment is provided in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

FIG. 1 illustrates a 4G device 114 and a 4G/5G device. While the terms 4G and 5G are used herein, these refer to any one of the many radio access technologies currently available or that may be deployed and available in the future. 4G and 5G are used simply as examples, and are not intended to limit aspects described herein. 4G device 114 includes a communication link 116 to the radio access component 102, whereas the 4G/5G device 118 includes a communication links 120 and 122 to the radio access component 112. Multiple communication links are illustrated for 4G/5G device 118 as it is capable of communicating with multiple radio access technologies (e.g., 4G and 5G).

In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices. In some aspects, user devices 114 and 118 can correspond to computing device 600 in FIG. 6. Thus, a user device can include, for example, a display(s), a power source(s) (e.g., a battery), a data store(s), a speaker(s), memory, a buffer(s), a radio(s) and the like. In some implementations, user devices 114 and 118 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

The radio of a cell site may include multiple antennas, and in some instances, may include a first set of antennas for a first radio access technology and a second set of antennas for a second radio access technology. As such, as shown here, antenna array (4G) 106 includes the antennas for transmitting/receiving data using 4G technology, and antenna array (5G) 104 includes the antennas for transmitting/receiving data using 5G technology. Typically when a cell site (typically includes radio access component and base station) is deployed, half or 50% of channel bandwidth is allocated to one radio access technology and the other half or 50% of channel bandwidth is allocated to the other radio access technology. Radio access component 102 is communicatively coupled to base station 108, which includes an eNodeB 112 for 4G communications and a gNodeB 110 for 5G communications.

Communications links, such as the wireless telecommunication links shown in FIG. 1 between each of the user devices and the radio access component 102 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short-range and long-range as different categories, or types, of connections (i.e., a primary connection and a secondary connection). A short-range connection may include a Wi-Fi connection to a device (e.g., mobile hotspot) that provides access to a communications network, such as a WLAN connection using 802.11 protocol. A short-range connection may also utilize mobile broadband, which provides wireless Internet access using a mobile broadband router. One example of mobile broadband technology is Evolution Data Optimized, or EVDO. EVDO relies on a signal from a wireless tower rather than a physical connection like a phone line or cable. An EVDO modem receives the signal and allows a user to connect to the Internet. Another example of mobile broadband is HSPA. A long-range connection may include a connection using one or more of CDMA, GPRS, GSM, TDMA, 802.16, and the like.

Figure 2:
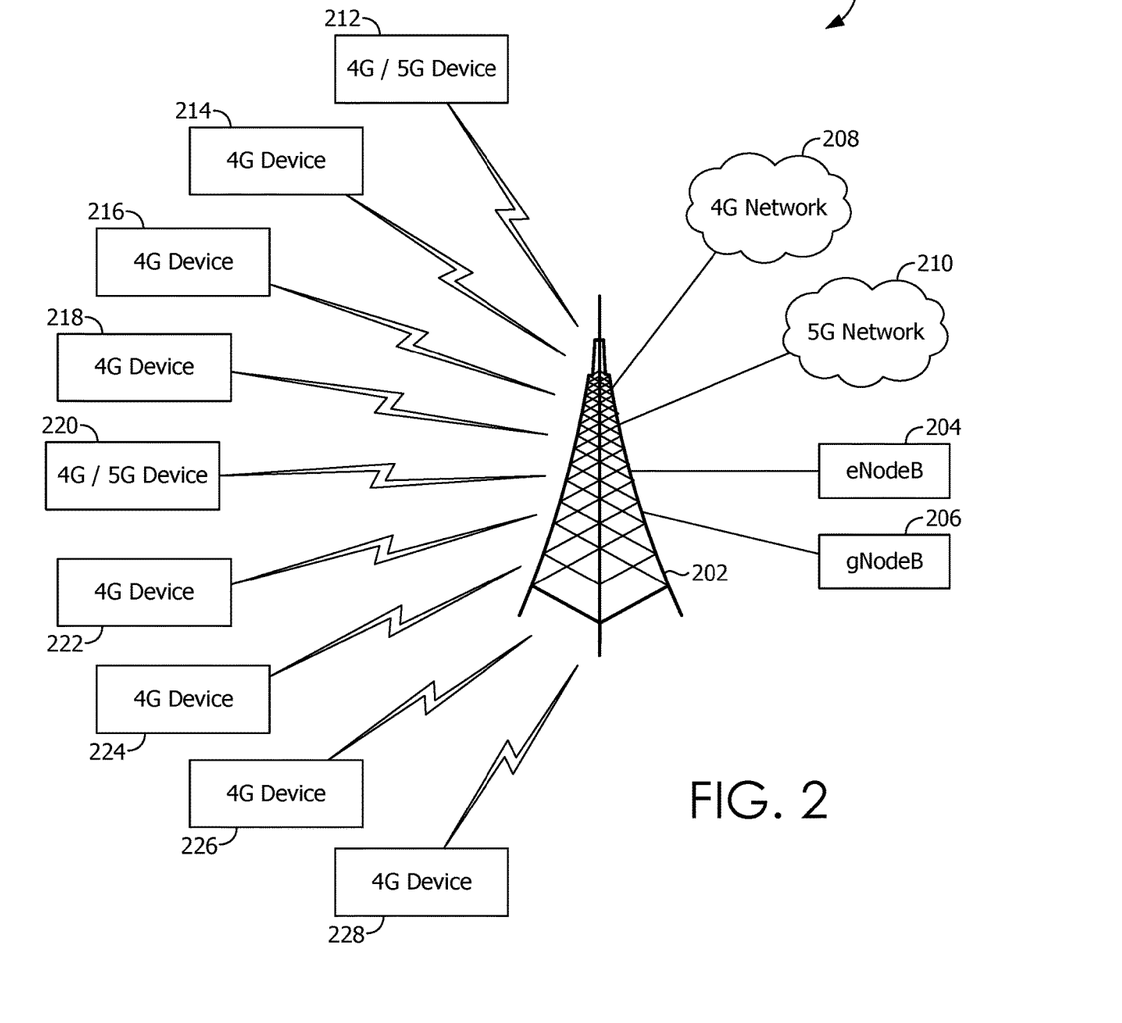
FIG. 2 illustrates a diagram of an exemplary network environment suitable for use in implementations of the present disclosure.

Turning now to FIG. 2, another exemplary networking environment suitable for use in aspects discussed herein is provided. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes multiple user devices, including 4G devices 214, 216, 218, 222, 224, 226, and 228 and 4G/5G devices 212 and 220. Environment 200 further includes cell site 202, 4G network 208, 5G network 210, eNodeB 204, and gNodeB 206. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices.

Figure 6:
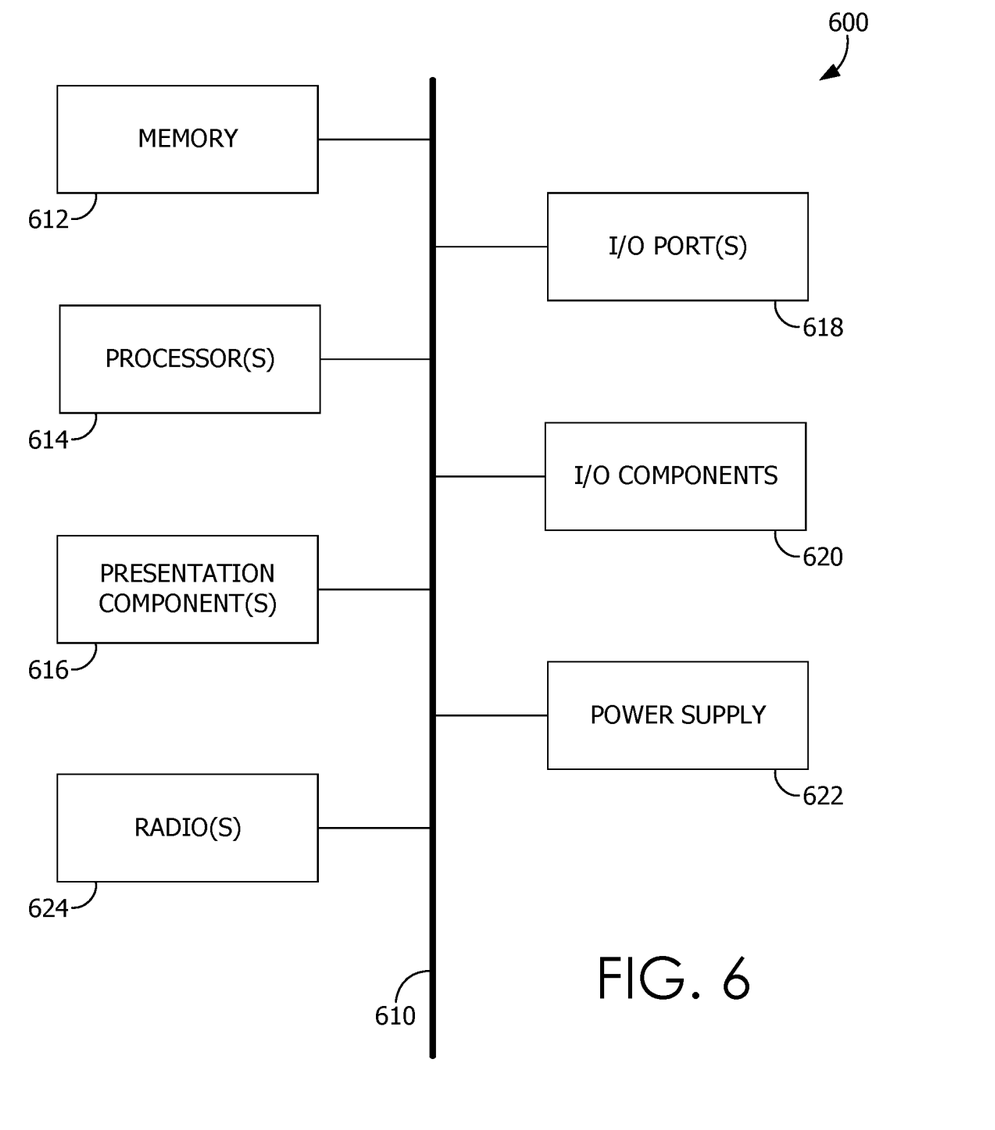
FIG. 6. depicts an exemplary computing environment suitable for use in implementation of the present disclosure.

In some aspects, the user devices shown in FIG. 2 can correspond to computing device 600 in FIG. 6. Thus, a user device can include, for example, a display(s), a power source(s) (e.g., a battery), a data store(s), a speaker(s), memory, a buffer(s), a radio(s) and the like. In some implementations, the user devices shown in FIG. 2 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices in network environment 200 can optionally utilize 4G network 208 and 5G network 210, through cell site 202, to communicate with other computing devices (e.g., a mobile device(s), a server(s), a personal computer(s), etc.). 4G network 208 and 5G network 210 may be telecommunications networks, or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. 4G network 208 and 5G network 210 can include multiple networks, as well as being a network of networks, but is shown in more simple form so as to not obscure other aspects of the present disclosure.

4G network 208 and 5G network 210 can be part of a telecommunication network that connects subscribers to their immediate service provider. In some instances, 4G network 208 and 5G network 210 can be associated with a telecommunications provider that provides services (e.g., LTE, 5G) to user devices, such as user devices 212-228. For example, 4G network 208 and 5G network 210 may provide voice services to user devices or corresponding users that are registered or subscribed to utilize the services provided by a telecommunications provider. While labeled as 4G and 5G networks, 4G network 208 and 5G network 210 can comprise any communication network providing voice and/or data service(s), such as, for example, a 1× circuit voice, a 3G network (e.g., CDMA, CDMA2000, WCDMA, GSM, UMTS), a 4G network (WiMAX, LTE, HSDPA), a 5G network, or a combination thereof.

As shown in network environment 200, which is provided for exemplary purposes only, there are seven (7) 4G devices and only two (2) 5G devices. In one aspect, the threshold may have been met for a quantity of 4G devices when compared to the quantity of 5G devices currently connected to cell site 202. In one aspect, it is determined what the current allocation of channel bandwidth is between 4G and 5G, and then this allocation can be modified. For example, if the current allocation if 50% channel bandwidth to 4G resources and 50% channel bandwidth to 5G resources, this allocation may be modified to be 60% channel bandwidth to 4G and 40% to 5G, or 70% channel bandwidth to 4G and 30% to 5G, or 80% channel bandwidth to 4G and 20% to 5G, etc. In one embodiment, the eNodeB 204 or gNodeB 206 makes the re-allocation determination, but this could also be done by some other network component. In one embodiment, this determination could be done using a lookup table.

Figure 3:
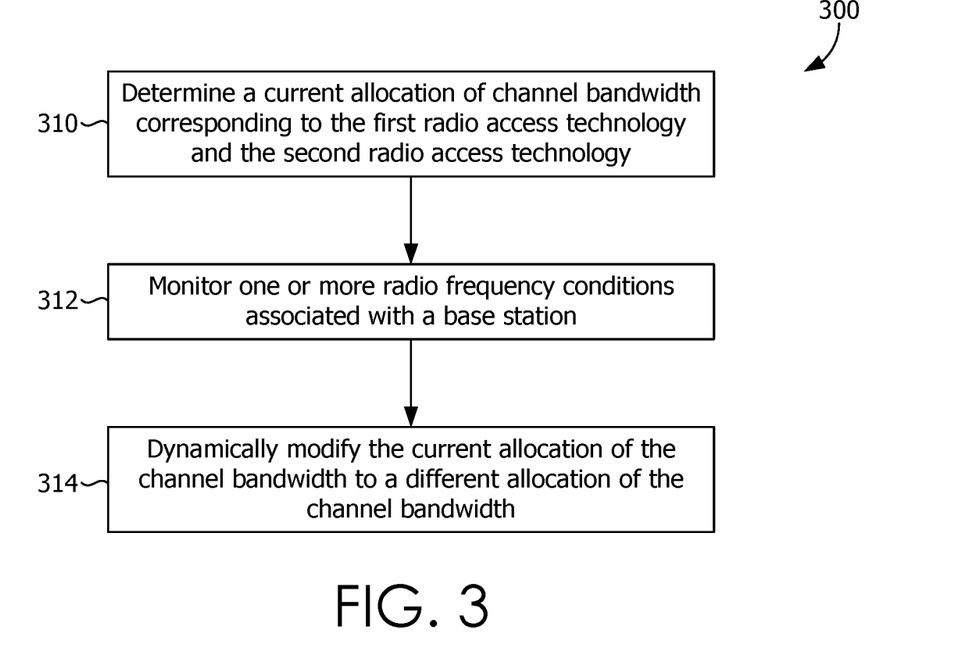
FIG. 3 depicts a flow diagram of an exemplary method for dynamically modifying bandwidth allocation corresponding to a first radio access technology and a second radio access technology, in accordance with implementations of the present disclosure.

FIG. 3 depicts a flow diagram of an exemplary method 300 for dynamically modifying bandwidth allocation corresponding to a first radio access technology and a second radio access technology. Initially, at block 310, a current allocation (e.g., 50%/50%) of channel bandwidth corresponding to a first radio access technology and a second radio access technology is determined. The first radio access technology, in one embodiment, is 4G, while the second radio access technology is 5G. However, these examples are provided for exemplary purposes only and are not meant to limit the aspects provided herein. At block 312, radio frequency conditions associated with a base station are monitored. The monitoring could be performed on the base station, a sector of the base station, or a cluster of base stations. These radio frequency conditions could be loading, a quantity of 4G-only user devices attached to the base station, a quantity of 5G user devices attached to the base station, or a quantity of 4G-only user devices attached to the base station that have a GBR.

At block 314, the current allocation of channel bandwidth is dynamically modified to a different allocation of channel bandwidth based on the monitoring of radio frequency conditions. For example, in one aspect, the greater amount of channel bandwidth may be allocated to the first radio access technology when a quantity of user devices capable of only the first radio access technology is above a threshold, which could be predetermined or determined in real-time. Or, the greater amount of channel bandwidth may be allocated to the first radio access technology when a quantity of user devices capable of only the first radio access technology is above a threshold and when a quantity of these devices have a GBR. Here, two criteria would need to be met before the channel bandwidth is reallocated.

Figure 4:
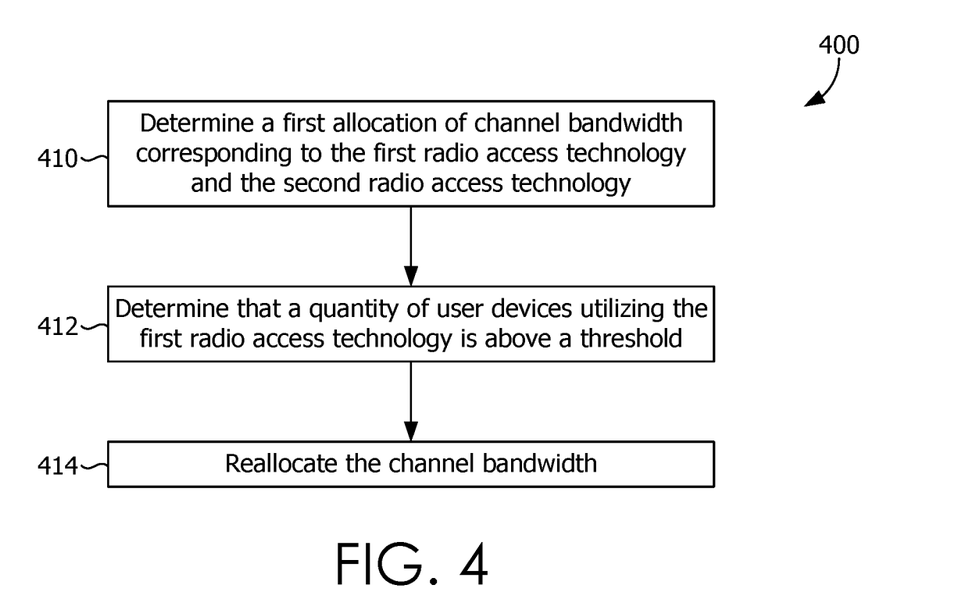
FIG. 4 depicts another flow diagram of an exemplary method for dynamically modifying bandwidth allocation corresponding to a first radio access technology and a second radio access technology, in accordance with implementations of the present disclosure.

FIG. 4 depicts another flow diagram of an exemplary method 400 for dynamically modifying bandwidth allocation corresponding to a first radio access technology and a second radio access technology. At block 410, a first allocation of channel bandwidth corresponding to the first radio access technology and the second radio access technology is determined. In one embodiment, the first radio access technology is 4G and the second radio access technology is 5G. At block 412, a quantity of user devices utilizing the first radio access technology is determined to be above a threshold. In embodiments, it may additionally or alternatively be determined whether a quantity of 4G user devices also have GBRs. This could be a second criteria needed to reallocate channel bandwidth. At block 414, the channel bandwidth corresponding to the first radio access technology and the second radio access technology is reallocated based on the quantity of user devices utilizing the first radio access technology being above the threshold. Reallocation may comprise increasing channel bandwidth to the first radio access technology if the criteria are met.

Figure 5:
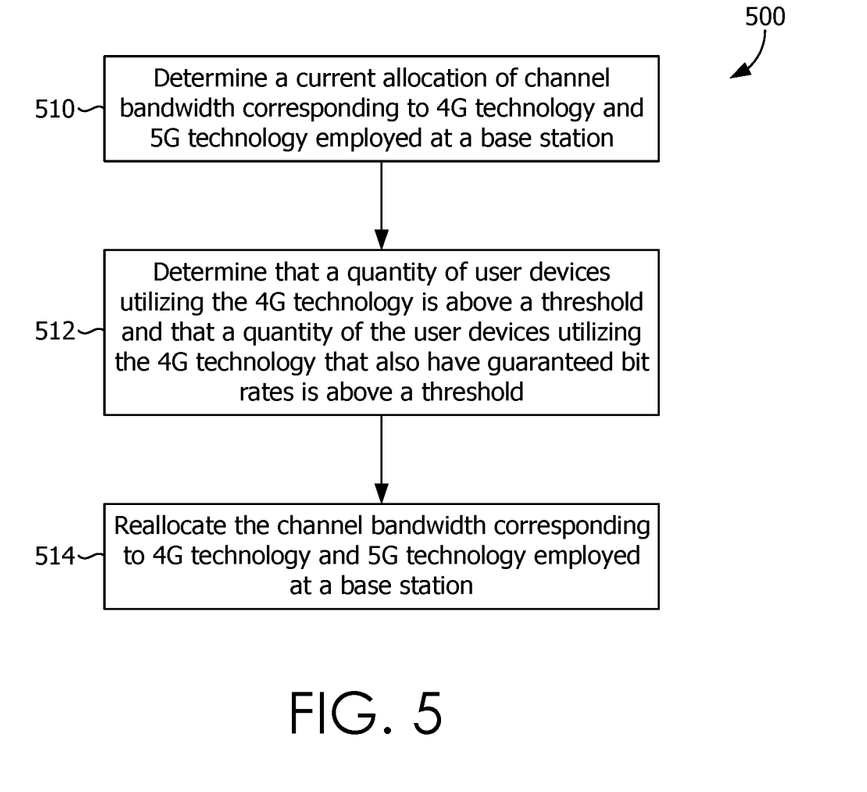
FIG. 5 depicts another flow diagram of an exemplary method for dynamically modifying bandwidth allocation corresponding to a first radio access technology and a second radio access technology, in accordance with implementations of the present disclosure.

FIG. 5 depicts another flow diagram of an exemplary method 500 for dynamically modifying bandwidth allocation corresponding to a first radio access technology and a second radio access technology. At block 510, a current allocation of channel bandwidth corresponding to 4G technology and 5G technology employed at a base station is determined. At block 512, it is determined that a quantity of user devices utilizing the 4G technology is above a threshold and that a quantity of these user devices utilizing 4G technology that also have GBRs is also above a threshold. At block 514, the channel bandwidth corresponding to the 4G and 5G technologies employed at a base station is reallocated. The reallocating increases the channel bandwidth corresponding to the 4G technology.

Referring to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 602 that directly or indirectly couples the following devices: memory 604, one or more processors 606, one or more presentation components 608, input/output (I/O) ports 610, I/O components 612, and power supply 614. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 612. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. Memory 604 may be removable, nonremovable, or a combination thereof. Exemplary memory includes solid-state memory, hard drives, optical-disc drives, etc. Computing device 600 includes one or more processors 606 that read data from various entities such as bus 602, memory 604 or I/O components 612. One or more presentation components 608 presents data indications to a person or other device. Exemplary one or more presentation components 608 include a display device, speaker, printing component, vibrating component, etc. I/O ports 610 allow computing device 600 to be logically coupled to other devices including I/O components 612, some of which may be built in computing device 600. Illustrative I/O components 612 include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, and the like. Radio 616 might additionally or alternatively facilitate other types of wireless communications including Wi-Fi, WiMAX, LTE, or other VoIP communications. As can be appreciated, in various embodiments, radio 616 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method for dynamically modifying bandwidth allocation corresponding to a first radio access technology and a second radio access technology at a single base station that implements a split mode antenna array, the method comprising:

determining, at a wireless telecommunications network, a current allocation of a channel bandwidth corresponding to the first radio access technology and the second radio access technology at the single base station that implements the split mode antenna array;

monitoring, at the wireless telecommunications network, one or more radio frequency conditions associated with the single base station; and determining that a quantity of user devices capable of only using the first radio access technology exceeds a threshold, dynamically modifying, at the wireless telecommunications network, the current allocation of the channel bandwidth corresponding to the first radio access technology and the second radio access technology at the single base station by increasing the channel bandwidth for the first radio access technology and decreasing the channel bandwidth for the second radio access technology.

2. The one or more non-transitory computer-readable media of claim 1, wherein the first radio access technology is 4G and the second radio access technology is 5G.

3. The one or more non-transitory computer-readable media of claim 2, wherein the monitored one or more radio frequency conditions comprise at least one of loading, a quantity of 4G-only user devices attached the base station, a quantity of 5G user devices attached to the base station, or a quantity of 4G-only user devices attached to the base station that have a guaranteed bit rate.

4. The one or more non-transitory computer-readable media of claim 1, wherein the quantity of the user devices capable of only using the first radio access technology further have a guaranteed bit rate.

5. The one or more non-transitory computer-readable media of claim 1, wherein the monitoring of the one or more radio frequency conditions may be performed at a base station, a sector of the base station, or a cluster of base stations.

6. The one or more non-transitory computer-readable media of claim 1, wherein the current allocation of the channel bandwidth corresponding to the first radio access technology and the second radio access technology is split equally between the first radio access technology and the second radio access technology.

7. A method for dynamically modifying bandwidth allocation corresponding to a first radio access technology and a second radio access technology at a single base station, the method comprising:
- determining, at a wireless telecommunications network, a first allocation of channel bandwidth corresponding to the first radio access technology and the second radio access technology at the single base station that implements a split mode antenna array;
- determining, at the wireless telecommunications network, that a quantity of user devices utilizing the first radio access technology is above a threshold; and
- reallocating, at the wireless telecommunications network, the channel bandwidth corresponding to the first radio access technology and the second radio access technology by increasing the channel bandwidth for the first radio access technology and decreasing the channel bandwidth for the second radio access technology.

8. The method of claim 7, wherein the first radio access technology is 4G and the second radio access technology is 5G.

9. The method of claim 7, further comprising determining that a quantity of the user devices utilizing the first radio access technology also have a guaranteed bit rate.

10. The method of claim 7, wherein the first radio access technology is 5G and the second radio access technology is 4G.

11. The method of claim 7, wherein the first allocation of the channel bandwidth corresponding to the first radio access technology and the second radio access technology is split equally between the first radio access technology and the second radio access technology.

12. A system, in a wireless telecommunications network, for dynamically modifying bandwidth allocation corresponding to a first radio access technology and a second radio access technology at a single base station, the system comprising:
- a processor; and
- one or more computer storage hardware devices storing computer-useable instructions that, when used by the processor, cause the processor to:
- determine a current allocation of a channel bandwidth corresponding to 4G technology and 5G technology employed at the single base station that implements a split mode antenna array,
- determine,
  (1) that a quantity of user devices utilizing the 4G technology is above a threshold, and
  (2) that a quantity of the user devices utilizing the 4G technology that also have guaranteed bit rates is above a threshold, and
- based on the determining, reallocate the channel bandwidth corresponding to the 4G technology and the 5G technology employed at the single base station, wherein the reallocating increases the channel bandwidth corresponding to the 4G technology.

13. The system of claim 12, wherein the quantity of user devices utilizing the 4G technology is greater than a quantity of users utilizing the 5G technology.

14. The system of claim 13, wherein the quantity of the user devices utilizing the 4G technology that also have the guaranteed bit rates is greater than a quantity of the user devices utilizing the 4G technology that do not have the guaranteed bit rates.

15. The system of claim 12, wherein the determining that the quantity of the user devices utilizing the 4G technology is above the threshold is determined for the single base station, a sector of the single base station, or a cluster of base stations that include the single base station.

* * * * *